(12) United States Patent
Mayer

(10) Patent No.: US 9,290,076 B2
(45) Date of Patent: Mar. 22, 2016

(54) VENTILATION CONTROL DEVICE FOR A MOTOR VEHICLE

(75) Inventor: Walter Mayer, Bruehl (DE)

(73) Assignee: Ford Global Technologies, LLC, Dearborn, MI (US)

( * ) Notice: Subject to any disclaimer, the term of this patent is extended or adjusted under 35 U.S.C. 154(b) by 1109 days.

(21) Appl. No.: 13/346,961

(22) Filed: Jan. 10, 2012

(65) Prior Publication Data

US 2012/0184197 A1 Jul. 19, 2012

(30) Foreign Application Priority Data

Jan. 13, 2011 (DE) .......................... 10 2011 002 606

(51) Int. Cl.
*B60H 1/34* (2006.01)
*B60H 1/00* (2006.01)

(52) U.S. Cl.
CPC ........ *B60H 1/00671* (2013.01); *B60H 1/00857* (2013.01)

(58) Field of Classification Search
CPC ................... B60H 1/00671; B60H 1/00857
USPC ................. 454/126, 155, 156, 194, 902
See application file for complete search history.

(56) References Cited

U.S. PATENT DOCUMENTS

| | | | | |
|---|---|---|---|---|
| 1,942,966 A * | 1/1934 | Larson | .................. | E05C 17/443 292/242 |
| 1,949,922 A * | 3/1934 | Simon | .................. | B60C 27/045 152/214 |
| 1,975,901 A * | 10/1934 | Mayer | .................... | H01H 73/50 335/202 |
| 2,003,927 A * | 6/1935 | Ecoff | ................. | B61D 27/0081 105/377.07 |
| 2,141,923 A * | 12/1938 | McMahan | ............... | F24F 7/013 292/201 |
| 2,175,791 A * | 10/1939 | Brauning | ................ | E05B 55/12 292/357 |
| 2,347,936 A * | 5/1944 | Crewson | ................. | F26B 21/04 137/552 |
| 2,400,044 A * | 5/1946 | Hermanson | ......... | F24F 13/1413 251/61 |
| 3,662,670 A * | 5/1972 | McCoy | ................... | F16K 1/165 454/194 |
| 4,518,181 A * | 5/1985 | Yamada | ................. | E05B 81/06 292/201 |
| 4,519,302 A * | 5/1985 | Nilsson | .............. | B60H 1/00042 137/625.46 |
| 4,656,926 A * | 4/1987 | Bauer | .................. | B60H 1/0065 251/248 |
| 4,760,877 A * | 8/1988 | Kondo | ............... | B60H 1/00835 165/42 |
| 4,767,096 A * | 8/1988 | Bouvot | ............. | B60H 1/00435 137/625.21 |
| 5,052,282 A * | 10/1991 | Scharamm | ......... | B60H 1/00857 237/12.3 A |
| 5,294,209 A * | 3/1994 | Naka | .................... | B23Q 1/0063 403/24 |
| 5,354,234 A * | 10/1994 | Arold | ........................ | F16C 7/04 251/228 |
| 5,645,479 A * | 7/1997 | Komowski | ......... | B60H 1/00849 454/139 |
| 5,779,535 A * | 7/1998 | Bendell | ............. | B60H 1/00842 137/637.3 |

(Continued)

FOREIGN PATENT DOCUMENTS

DE 3813116 A1 10/1989
DE 19528714 C1 8/1996

*Primary Examiner* — Steven B McAllister
*Assistant Examiner* — Jonathan Cotov
(74) *Attorney, Agent, or Firm* — Vichit Chea; Brooks Kushman P.C.

(57) ABSTRACT

A ventilation system of a motor vehicle includes a first air control flap driven by a first mechanism, a second air control flap driven by a second mechanism, and a counterstop connected with the second mechanism. The counterstop is driven by the second mechanism between an operative position wherein it restricts movement of the first mechanism away from a reference position, and an inoperative position wherein it does not restrict movement of the first mechanism away from the reference position. The second mechanism has an idle region over which the counterstop may be moved without moving the second flap. The second mechanism may include an eccentric disk rotatable by an actuator to move the counterstop between the operative and inoperative positions.

10 Claims, 3 Drawing Sheets

(56) References Cited

U.S. PATENT DOCUMENTS

| | | | | |
|---|---|---|---|---|
| 5,901,943 A * | 5/1999 | Tsunoda | B60H 1/00692 | 251/294 |
| 6,036,593 A * | 3/2000 | Koerber | B60H 1/00857 | 292/266 |
| 6,354,934 B1 * | 3/2002 | Seuge | B60H 1/00857 | 251/279 |
| 6,354,935 B1 * | 3/2002 | Kurokawa | B60H 1/00857 | 454/156 |
| 6,475,077 B2 * | 11/2002 | Arold | B60H 1/00064 | 165/42 |
| 6,579,167 B1 * | 6/2003 | Demeniuk | B60H 1/00671 | 165/41 |
| 6,607,029 B2 * | 8/2003 | Danieau | B60H 1/00021 | 165/203 |
| 6,702,008 B1 * | 3/2004 | Hibino | B60H 1/00842 | 165/202 |
| 6,789,617 B1 * | 9/2004 | Hashizume | B60H 1/00857 | 165/103 |
| 6,891,458 B2 * | 5/2005 | Hyatt Jr. | E05B 47/0002 | 335/259 |
| 7,404,760 B2 * | 7/2008 | Bowler | B60H 1/00671 | 454/143 |
| 7,658,671 B2 * | 2/2010 | Balzo | B60H 1/00857 | 137/865 |
| 7,748,641 B2 * | 7/2010 | Sudoh | B60H 1/00671 | 236/101 E |
| 2007/0111649 A1 * | 5/2007 | Nowak | B60H 1/0065 | 454/69 |
| 2008/0182500 A1 * | 7/2008 | Jessen | B60H 1/00671 | 454/155 |
| 2008/0305732 A1 * | 12/2008 | Dippel | B29C 45/0017 | 454/155 |
| 2009/0305623 A1 * | 12/2009 | Lange | B60H 1/00671 | 454/121 |
| 2014/0308890 A1 * | 10/2014 | Schneider | F24F 13/1426 | 454/335 |

* cited by examiner

VENTILATION CONTROL DEVICE FOR A MOTOR VEHICLE

CROSS-REFERENCE TO RELATED APPLICATIONS

This application claims foreign priority benefits under 35 U.S.C. §119(a)-(d) to DE 10 2011 002 606.1, filed Jan. 13, 2011, which is hereby incorporated by reference in its entirety.

TECHNICAL FIELD

The invention relates to a ventilation system of a motor vehicle and more specifically to a control device for a heating and/or air conditioning system.

BACKGROUND

In order to minimize the complexity and cost of the air conditioning system, a plurality of flaps in the device for ventilation control is often controlled jointly by means of the same "mode disk", i.e. a mechanical cam, and the actuator connected by means of the same to the cam. The drive is typically an electric motor or a rotary knob that can be set by hand.

In addition to temperature blending, another known practice is that of controlling the actual control flaps in the ventilation control device with a single cam and a single actuator. The air control flaps are assigned to corresponding air ducts and guide the respective air flows which are to be discharged via corresponding nozzles in the floor area (floor), at the front of the dashboard (panel) and under the windshield (defrost), for example.

In a modern ventilation control device, however, there is generally a dedicated guide cam for each flap on the cam ("mode disk"), said guide cam typically being operatively connected to the respective flap by a train of levers or links in order to adjust the flap. The guide cams are generally configured in such a way that the setting modes provided for air distribution determine the desired defined combination of air distribution flows, and do so in a typical recurring sequence. One example of a typical recurring sequence is: (A) air distribution only to the floor area "Floor" (B) air distribution to the dashboard and floor area "Panel & Floor" (C) air distribution only to the dashboard "Panel" (D) air distribution to the windshield and dashboard "Defrost & Panel" ←→ air distribution only to the windshield "Defrost" (F) air distribution to the windshield and foot area "Defrost & Floor".

To reduce costs, an actuator without absolute position (rotation angle) feedback, e.g. a stepper motor or a brushless DC motor with a pulse counter (referred to as "DC pulse count motors"), is often used for driving the cam. To enable control by means of such a motor, a defined reference position is required. This is necessary for determining the position of the cam during operation.

One known solution for this purpose is to provide a mechanical stop on the cam, said stop interacting with a counterstop in order to define a reference position of the cam. As a result of this stop, no transition between the desired positions is possible at the angular position in which it is operative since the cam is not freely rotatable. If, for example, the mechanical stop is provided between the "Defrost & Floor" and the "Floor" setting in the direction of rotation in a ventilation device of the type in question offering the above-mentioned combinations of "Floor" ←→"Panel & Floor" ←→ "Panel" ←→ "Defrost & Panel" ←→ "Defrost" ←→ "Defrost & Floor", no direct transition from "Floor" to "Defrost & Floor" and vice versa is possible. In other words, the cam must be moved through all the settings in between, i.e. from "Floor", via "Panel & Floor", "Panel", "Defrost & Panel" and via "Defrost" to reach the position "Defrost & Floor". This may annoy the user since it gives rise to unwanted and unexpected behavior by the ventilation control device. Moreover, wear is increased since a longer setting distance has to be traveled on average because unwanted intermediate setting modes have to be passed through in order to reach the desired setting mode.

SUMMARY

It is therefore an object of the present invention to improve a ventilation control device of the type in question in such a way that unexpected and/or undesired behavior can be avoided and/or wear can be reduced but the use of a low cost drive without built-in position measurement is still possible without modification.

In an embodiment disclosed herein, a ventilation system of a motor vehicle comprises a first air control flap, a rotatable cam connected to the flap to position the flap in accordance with an angular position of the cam, and a counterstop. The counterstop is movable between an operative position wherein it restricts rotation of the cam away from a reference position, and an inoperative position wherein it does not restrict rotation of the cam away from the reference position. The selectable counterstop allows the restriction to movement of the air control flap to be removed when this is more convenient and/or more efficient.

BRIEF DESCRIPTION OF THE DRAWINGS

Further details of the invention are explained with reference to the attached drawings, in which:

FIGS. 1A-D show a schematic side view of a first embodiment of a ventilation control device, wherein FIG. 1A, FIG. 1B, FIG. 1C and FIG. 1D illustrate snapshots of the ventilation control device in various operating positions;

In the figures, identical or equivalent components of the embodiments are provided with identical reference signs.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1A:
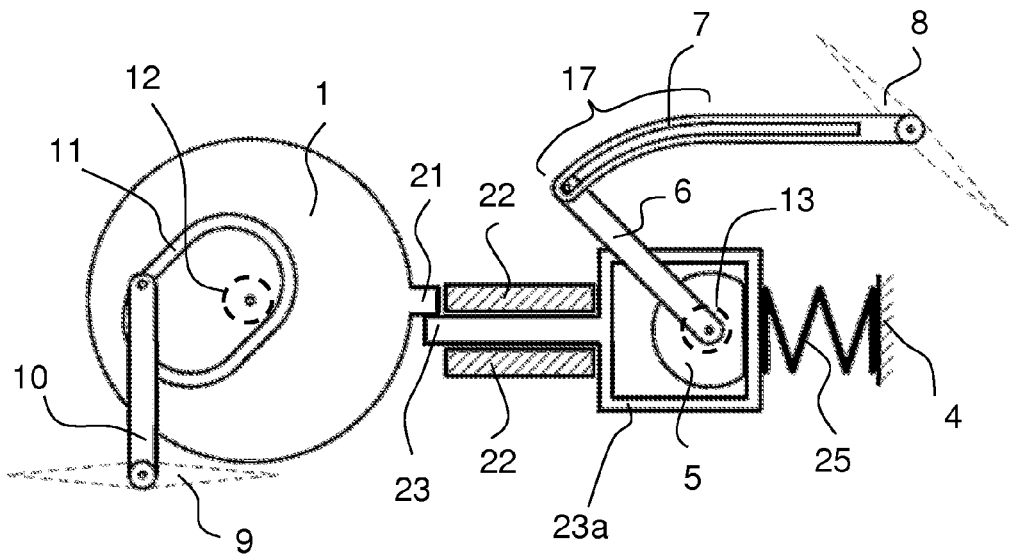
Figure 1B:
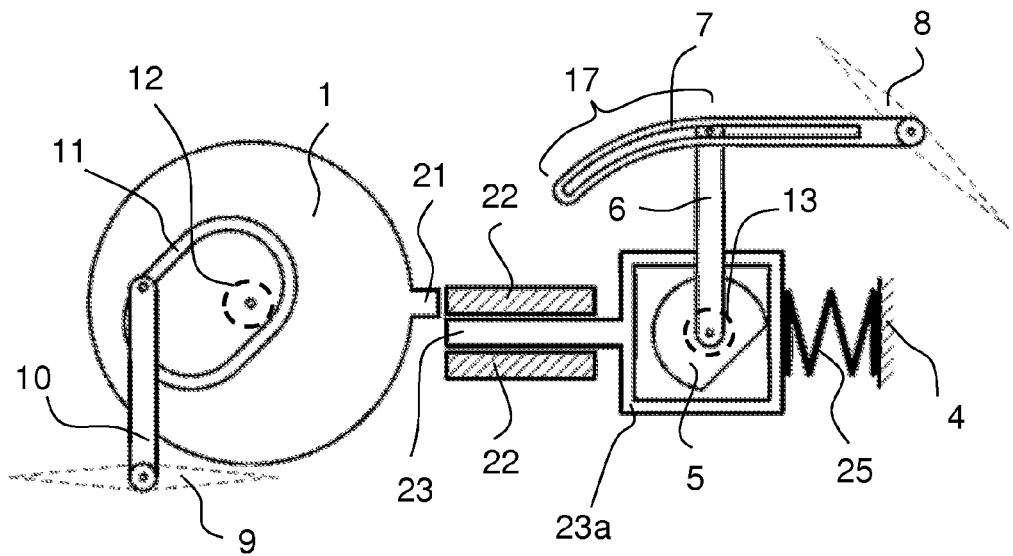
Figure 1C:
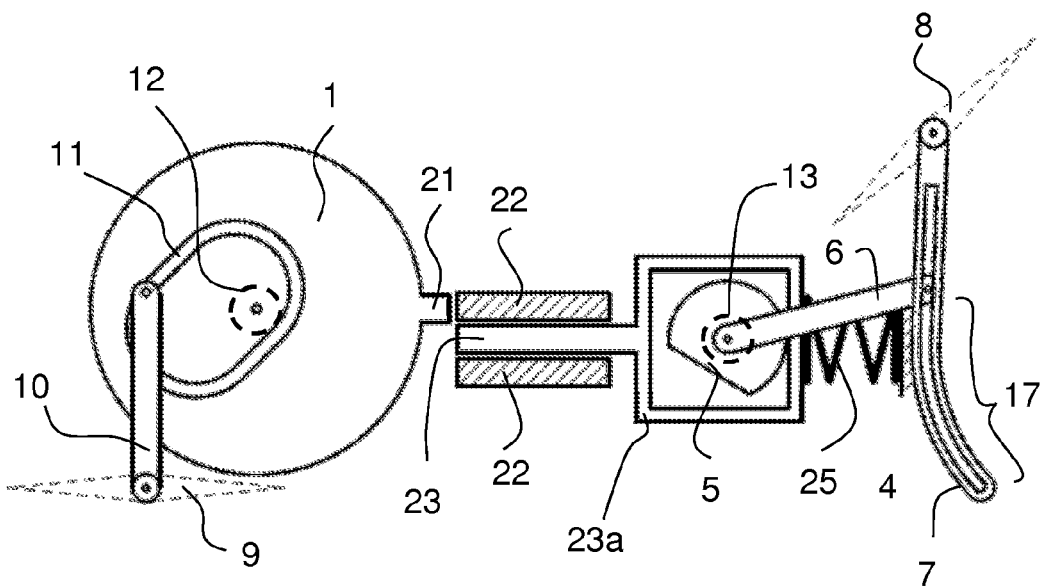
Figure 1D:
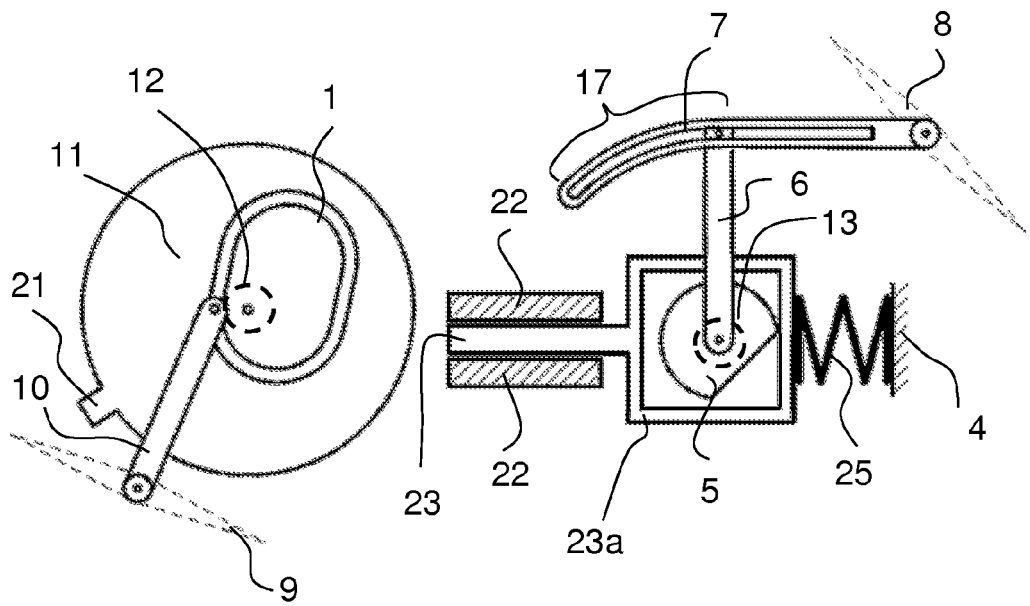
Figure 2:
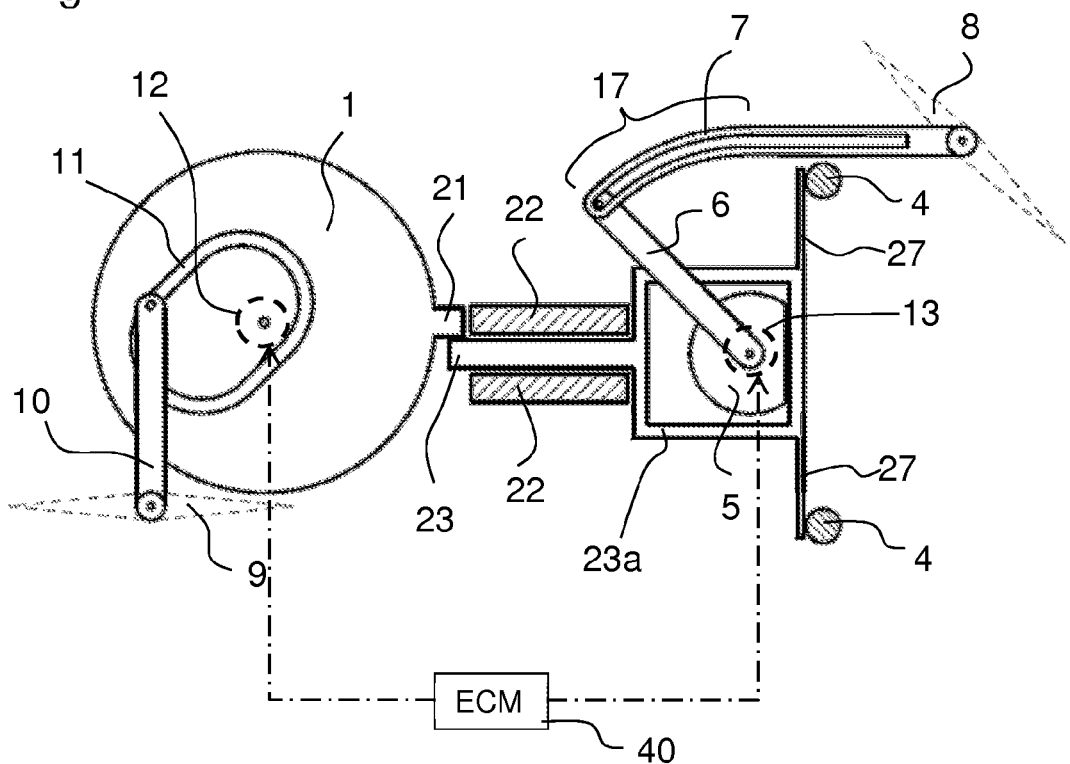
FIG. 2 shows a schematic side view of a second embodiment of a ventilation control device.
Figure 3:
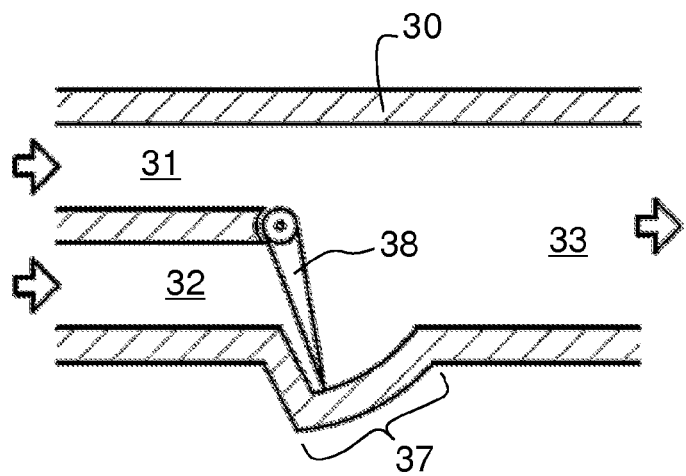
FIG. 3 shows a variant for the provision of an idle region through an appropriate shape of the air duct region.

In the drawings, FIGS. 1-3, various components that are known per se are not shown for the sake of simplicity, e.g. the housing of the ventilation control device or the electric motors.

FIGS. 1A-D show a cam 1 with a guide cam 11, which is formed by a corresponding guide track or groove in the side face of the cam 1. By way of a one-armed control lever 10, which is attached to an air control flap 9 for conjoint rotation therewith, the guide cam 11 controls the pivoted or tilted position of said air control flap 9. For the sake of simplicity, only one air control flap 9, one guide cam 11 and one control lever 10 are shown although a plurality of such air control flaps may be provided in a manner known per se for the purpose of setting the desired air flows.

The air control flaps 9 are actuated by means of the corresponding guide cams in or on the cam 1, for which purpose the cam 1 is coupled for rotation to an actuator 12. Actuator 12 may be, for example, an electric motor which, as mentioned at the outset, may be of a type that does not provide or allow absolute rotation angle feedback. Actuator 12, cam disk 1, and control lever 10 may be said to comprise a first drive mechanism that is operative to position flap 9.

FIGS. 1A-D furthermore show an end stop 21 provided on the cam 1, said end stop interacting with a counterstop 23 explained in greater detail below to define a reference position of the cam in order to enable the cam to be controlled in a known manner by means of the actuator (not shown). In other words, when end stop 21 strikes against counterstop 23, the predefined angular position of the cam 1 is always the same and so may serve as a known reference position. In the illustrative embodiment shown, end stop 21 is formed like a boss and projects radially from the circumference of cam 1. As an alternative, it is also possible for the end stop to be designed as a recess or notch in the outer circumference of the cam or, alternatively, as transverse to the plane of FIGS. 1A-D, i.e. parallel to the axis of rotation of cam 1.

The counterstop 23 is movably mounted and can be moved by means of actuator 13 (and related mechanism) from the operative (extended) position shown in FIG. 1A to the inoperative (retracted) position as per FIGS. 1B-D. As a result, the counterstop 23 can be moved in selectively as required. However, in the inoperative position as per FIGS. 1B-D, the end stop 21 cannot contact and restrict movement of counterstop 23, i.e. the cam 1 can be rotated freely by >360° around its axis of rotation. This ensures an unrestricted transition between all possible settings of the cam 1 in both directions of rotation, i.e. that the desired setting can always be adopted by means of the smallest angle of rotation, and it is still possible to adopt the angular reference position when required.

In the embodiment shown, the counterstop 23 is mounted so as to be movable radially relative to the axis of rotation of the cam 1. For this purpose, a bearing 22 is provided, being arranged in an appropriate manner in or on the housing (not shown) of the ventilation control device. The housing may also support cam 1 for rotation, as well as actuator 12. Counterstop 23 is accordingly provided with a pin-shaped or cylindrical part which slides in the bearing 22 and the tip of which interacts with the end stop 21 on cam 1.

Various drives are possible for actuating the counterstop 23 between the operative (extended) and inoperative (retracted) positions. For example, an inductive linear drive could be provided in the plain bearing 22, said drive moving the counterstop 23 that can be moved in against a spring load only when the intention is to adopt and/or determine the angular reference position.

In the embodiment shown, however, the drive of the counterstop 23 is achieved differently. In FIGS. 1A-D, the counterstop 23 is spring-loaded by, for example, a coil spring 25 in the direction of the operative position. Spring 25 is inserted between a support 4 and the opposite end of counterstop 23 from the cam 1. The region of the counterstop 23 remote from the cam 1 has a recess 23a, represented in a purely schematic way as a rectangle, in which a further cam with a guide cam on the outer circumference, i.e. an eccentric disk 5, is rotatably arranged. The eccentric disk 5 is attached for conjoint rotation to the output shaft of an actuator schematically indicated by 13. Given a suitable shape of eccentric disk 5, the counterstop 23 can thus return automatically to the operative (extended) position without a torque on the cam 1. Thus, when starting the device, e.g. when starting a car fitted with the ventilation control device, the angular reference position can be adopted without the need to actuate the actuator 13.

As is apparent from a comparison of FIG. 1A with FIGS. 1B-D, the recess 23a in the counterstop 23 and the eccentric disk 5 form a design by means of which the selective inward movement or actuation of the movable counterstop 23 takes place by means of the actuator 13.

As is furthermore apparent from FIGS. 1-2, a second air control flap 8 is provided along with a mechanism my which it may be moved by actuator 13. This mechanism has a first lever 6, which is coupled for conjoint rotation to the drive shaft of the actuator 13, and a second lever 7, which is attached for conjoint rotation to the bearing shaft of a second flap 8 in order to pivot the flap 8 about said bearing shaft, as is apparent from FIG. 1A when compared with FIG. 1C. Actuator 13, first lever 6, and second lever 7 may be said to comprise a second drive mechanism that is operative to position flap 8.

It should be noted here that the second flap 8 is a flap, e.g. a temperature flap or a recirculated air flap, which is known per se and is already provided in any case in the ventilation control device. In other words, the disclosed apparatus makes it possible to use the actuator 13 (which is usually already present as the drive) for actuating the counterstop 23, thus eliminating the need for an additional drive.

In order to exploit this synergy, it is advantageous to provide an "idle region", in which actuation of the second flap 8 does not lead to actuation of the counterstop 23 and vice versa. This may be achieved by means of an idle region in one of the mechanisms for actuating the second flap 8 and the counterstop 23. FIGS. 1A-D show a first variant with a corresponding idle region 17 in the link mechanism of the levers 6, 7. As is apparent from FIG. 1A when compared with FIG. 1B, the levers 6, 7 are designed in such a way that a single actuator 13 can actuate the counterstop 23 without changing the flap position of the second flap 8. This may, for example, be achieved by means of a curved, elongate hole in the second lever 7, in which a catch on the output end of the first lever 6 engages. As an idle region 17, the elongate hole in the second lever has a circular cam segment, which is concentric with a drive axis of rotation of actuator 13. In this cam segment or idle region 17 of the elongate hole, the catch on the first lever 6 cannot transmit any torque to the second lever, i.e. it can pivot freely. Only when first lever 6 rotates clockwise beyond the position shown in FIG. 1B, e.g. into that shown in FIGS. 1C-D, does the catch on the first lever 6 engage in the straight (non-curved) segment of the elongate hole of the second lever 7 and pivot the flap 8.

This simple measure has the effect that control of the second flap, e.g. a temperature or recirculated air flap, on the one hand, and actuation of the counterstop by means of the same drive, on the other hand, can take place independently but nevertheless with the same drive or actuator.

As an alternative configuration of an idle region, FIG. 3 shows a specially configured mixing region or air duct region 30 of the housing of the ventilation control device for mixing air from a cold air duct 31 with air from a warm air duct 32. Here, air duct region 30 is shaped to provide an extended pivoting range of the air control flap 38 that forms an inoperative idle region 37 in the air duct. Within the idle region 37, the air control flap 38 can pivot without changing the mixing ratio of air from the ducts 31, 32 entering the outlet duct 33.

The angular extent of this idle region 37 corresponds to the angle of rotation required to actuate the counterstop, if appropriate with a reduction by means of a reduction ratio. By means of a configuration in accordance with FIG. 3, it is possible to continue using already developed or produced mechanism components for the flap 38 without modification.

As shown and described, the second flap itself can be assigned an idle region, within which the second flap can pivot without taking effect, i.e. without changing the mixing ratio that the second flap is supposed to achieve. In terms of design, this can be achieved in a simple manner by arranging the corresponding idle region in a region of an air duct in which the second flap is provided. This embodiment is appropriate especially in the case of a temperature flap, which sets the mixing ratio of two air flows at different temperatures.

FIG. 2 shows a variant of the mechanism for actuating the counterstop 23, specifically an alternative return spring. In FIG. 2, a leaf spring 27 is formed integrally or in one piece on the component which forms the movable counterstop 23. The leaf spring 27 is mounted on corresponding supports 4, which may be disposed on or formed with the housing. This configuration reduces the number of components as compared with that shown in FIGS. 1A-D.

The operation of the counterstop 23 will be apparent from FIGS. 1A-D. In the rest position, e.g. during the starting process of the car, the counterstop 23 is in the operative position shown in FIG. 1A. The end stop 21 can thus strike against the counterstop 23 in order to determine the angular reference position of the cam 1. During normal operation of the ventilation control device, the counterstop 23 is not required and is moved into the neutral position shown in FIG. 1B by means of the eccentric disk 5 under power of actuator 13, although there is no change in the flap 8 owing to the idle region 17. From the position shown in FIG. 1B onward, however, the actuator 13 can be used, in accordance with its purpose, to exploit further the angular range in the clockwise direction, for example, to pivot the flap 8 into the other extreme position thereof, which is shown in FIG. 1C. As is immediately apparent from FIG. 1D, the cam 1 can also be rotated freely through 360° in the neutral position of the counterstop 23. It is thus possible, from each ventilation setting, to set both of the respective ventilation positions that are adjacent in the direction of rotation, both in the clockwise and the counterclockwise direction, thus reducing the average rotation distance of the cam 1 overall and, accordingly, reducing the amount of wear and improving ease of operation.

For control, it is possible to provide a control circuit, such as may be achieved by an electronic control module 40 (see in FIG. 2), which is connected to either one or both of the actuators 12, 13. This control circuit may be configured in such a way, for example, that it moves the counterstop 23 into the operative position by means of the actuator 13 in order to specify the reference position for the actuator 12, and may also rotate cam 1 by means of the actuator 12 until the end stop 21 thereof collides with the counterstop 23. The control circuit can then define this position as the reference position of the actuator 12 for setting the position of the air control flaps 9 during operation.

Accordingly, the disclosed embodiments exhibit a configuration which makes it possible to bring the end stop—required for determining the reference position—effectively into contact only when determination of the reference position is actually desired or is actually being carried out. This may take place when the motor vehicle system is started, e.g. when starting the engine or motor of the vehicle. This enables the continued use of an electric motor without built-in rotation angle measurement, in particular without absolute rotation angle feedback, e.g. of a simple stepper motor or of a DC pulse count motor.

The disclosed embodiment also exhibit a second actuator for positioning the second flap and, for this purpose, is operatively connected to the mechanism that actuates the counterstop. In other words, the drive which is in any case present as original equipment for the second flap is used as drive or actuator for the counterstop. Thus, no additional drive is provided for actuating the counterstop, thereby reducing costs.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A ventilation system of a motor vehicle comprising:
a first motor rotating a cam to position a first flap;
a second motor driving a mechanism to position a second flap; and
a counterstop movable by the second motor between an operative position wherein it prevents rotation of the cam beyond a reference position, and an inoperative position wherein it permits rotation of the cam away from the reference position, the mechanism having an idle region over which the counterstop moves without moving the second flap.

2. The apparatus of claim 1 wherein the mechanism comprises an eccentric disk rotatable by the second motor to move the counterstop between the operative and inoperative positions.

3. The apparatus of claim 1 wherein the mechanism comprises a first lever driven by the second motor and a second lever fixed to the second flap and having a surface engaging a catch on the first lever, wherein the idle region is defined by a segment of the surface that is concentric with a drive axis of the second motor.

4. The apparatus of claim 1 wherein the second flap is disposed in an air duct and is movable to set a mixing ratio, the idle region corresponding to a range within which the second flap may pivot without changing the mixing ratio.

5. The apparatus of claim 1 wherein the counterstop is movable radially with respect to an axis of rotation of the cam and is biased to the operative position by a spring.

6. The apparatus of claim 5 wherein the spring is a coil spring.

7. The apparatus of claim 5 wherein the cam comprises an end stop projecting radially outward from the cam for engagement with the counterstop when the cam is at the reference position.

8. The apparatus of claim 1 further comprising a ventilation system housing supporting the counterstop, the cam and the first air control flap.

9. A vehicle ventilation system comprising:
a first motor driving a first mechanism to position a first flap; and
a second motor driving a second mechanism to position a second flap and move a counterstop between an operative position preventing movement of the first mechanism beyond a position, and an inoperative position permitting movement of the first mechanism beyond the position, the second mechanism having an idle region over which the counterstop moves without moving the second flap.

10. A vehicle ventilation system comprising:

a first motor rotating a cam to position a first flap; and a second motor driving a mechanism to position a second flap and move a counterstop between an operative position preventing rotation of the cam beyond a position and an inoperative position permitting rotation of the cam beyond the position, the mechanism having an idle region over which the counterstop moves without moving the second flap.

\* \* \* \* \*